United States Patent
Kouda et al.

(10) Patent No.: US 11,040,580 B2
(45) Date of Patent: Jun. 22, 2021

(54) PNEUMATIC TIRE

(71) Applicant: The Yokohama Rubber Co., LTD., Tokyo (JP)

(72) Inventors: Hiraku Kouda, Hiratsuka (JP); Jun Matsuda, Hiratsuka (JP); Atsushi Tanno, Hiratsuka (JP); Masaaki Nagayasu, Hiratsuka (JP); Ryohei Takemori, Hiratsuka (JP); Yuki Sasaya, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 16/770,571

(22) PCT Filed: Dec. 4, 2018

(86) PCT No.: PCT/JP2018/044503
§ 371 (c)(1),
(2) Date: Jun. 5, 2020

(87) PCT Pub. No.: WO2019/111876
PCT Pub. Date: Jun. 13, 2019

(65) Prior Publication Data
US 2020/0376903 A1 Dec. 3, 2020

(30) Foreign Application Priority Data
Dec. 6, 2017 (JP) .............................. JP2017-234522

(51) Int. Cl.
*B60C 15/04* (2006.01)
*B60C 15/06* (2006.01)
(Continued)

(52) U.S. Cl.
CPC .............. *B60C 15/04* (2013.01); *B60C 15/06* (2013.01); *B60C 17/0009* (2013.01);
(Continued)

(58) Field of Classification Search
CPC ..... B60C 15/04; B60C 15/06; B60C 15/0603; B60C 2015/0617; B60C 2015/0621; B60C 2015/061
See application file for complete search history.

(56) References Cited

U.S. PATENT DOCUMENTS

| | | | |
|---|---|---|---|
| 2015/0020944 A1 | 1/2015 | Till et al. | |
| 2015/0075691 A1* | 3/2015 | Merino Lopez | ........ B60C 15/04 152/502 |
| 2015/0083299 A1* | 3/2015 | Yukawa | .............. B60C 15/0027 152/517 |

FOREIGN PATENT DOCUMENTS

| | | | |
|---|---|---|---|
| JP | 11189018 | A * | 7/1999 |
| JP | 2000-351306 | | 12/2000 |

(Continued)

OTHER PUBLICATIONS

International Search Report for International Application No. PCT/JP2018/044503 dated Mar. 12, 2019, 4 pages, Japan.

*Primary Examiner* — Robert C Dye
*Assistant Examiner* — Farah Taufiq
(74) *Attorney, Agent, or Firm* — Thorpe North & Western (57) ABSTRACT

In a pneumatic tire including a side reinforcing layer, the maximum width W0 of a bead core and the widths W1, W2 of the bead core at innermost and outermost sides in the radial direction, respectively, satisfy W1>W2 and W2≤0.5× W0. W0 is toward the inside of the center of the bead core in the radial direction. A carcass is folded and curved along the bead core, and a folded back portion of the carcass extends toward the sidewalls while contacting a body of the carcass. A rubber occupancy ratio in a region formed by the body and the folded back portion of the carcass is 0.1% to 15%. The cross-sectional area S2 of a filler toward the outside of the carcass in the lateral direction, the hardness H2 of the filler, the cross-sectional area S1 of a side
(Continued)

reinforcing layer and the hardness H1 of the side reinforcing layer satisfy $0.15 \leq (S2 \times H2)/(S1 \times H1) \leq 0.60$.

18 Claims, 6 Drawing Sheets

(51) Int. Cl.
*B60C 17/00* (2006.01)
*B60C 9/04* (2006.01)

(52) U.S. Cl.
CPC ............ *B60C 2009/0425* (2013.01); *B60C 2015/0614* (2013.01); *B60C 2017/0063* (2013.01)

(56) References Cited

FOREIGN PATENT DOCUMENTS

| | | |
|---|---|---|
| JP | 2001-510419 | 7/2001 |
| JP | 2002-301915 | 10/2002 |
| JP | 2008-149778 | 7/2008 |
| JP | 2015-020741 | 2/2015 |
| JP | 2015-067002 | 4/2015 |
| WO | WO 98/33670 | 8/1998 |

* cited by examiner

PNEUMATIC TIRE

TECHNICAL FIELD

The present technology relates to a pneumatic tire provided with a side reinforcing layer on a sidewall portion, and more particularly, relates to a pneumatic tire that provides an improved structure of a bead portion allowing for reduction in tire weight while maintaining tire durability and providing improved rim disengagement resistance.

BACKGROUND ART

In general, a bead core and a bead filler are embedded in a bead portion of a pneumatic tire. Additionally, a pneumatic tire (a so-called run-flat tire) that can safely travel a certain distance even when a puncture occurs is structured such that a side reinforcing layer (a layer formed of a hard rubber having a cross sectional shape that is crescent-shaped) is provided on a sidewall portion for supporting a load applied from a vehicle when the tire is punctured. In such a tire, an inner end portion of the side reinforcing layer in the tire radial direction may reach a location near the bead portion. Accordingly, the thickness of the location near the bead portion increases, and thus the tire weight is likely to increase. Moreover, the rigidity of a location around a portion contactable with a rim flange is increased due to the presence of the side reinforcing layer. In this case, during run-flat traveling, a force that rotates the bead portion toward the tire inner side about the portion contacting the rim flange may be generated, and thus the tire is likely to be disengaged from the rim.

On the other hand, in recent years, a reduction in tire weight has been strongly demanded, and weight reduction of the foregoing run-flat tire has also been considered. For example, in Japan Unexamined Patent Publication No. 2002-301915, a pneumatic tire provided with a side reinforcing layer having a crescent-shape in cross-section is structured such that the shape of a bead core is contrived, and thus a bead filler is eliminated. However, with such a tire, although the tire weight can be reduced, the rigidity in a location near a bead portion is low. Accordingly, tire durability cannot be sufficiently obtained. In addition, the rim disengagement caused by the force rotating the rim flange about a portion contacting the rim flange is not considered, and an additional countermeasure is thus required.

SUMMARY

The present technology provides a pneumatic tire including a side reinforcing layer on a sidewall portion, providing an improved structure of a bead portion allowing for reduction in tire weight while maintaining tire durability and providing improved rim disengagement resistance.

A pneumatic tire according to an embodiment of the present technology includes: a tread portion extending in a tire circumferential direction and having an annular shape; a pair of sidewall portions disposed on opposite sides of the tread portion; a pair of bead portions disposed toward the inside of the sidewall portions in a tire radial direction; a bead core provided in each of the bead portions;

a carcass layer mounted between the pair of bead portions; and a side reinforcing layer provided toward the inside of the carcass layer in the sidewall portion in a tire lateral direction and having a crescent-shape in cross-section. The bead core includes at least one bead wire wound in the tire circumferential direction. A plurality of circumferential portions of the bead wire form at least one row arranged in the tire lateral direction and a plurality of layers overlapping in the tire radial direction. A maximum width $W0$ of the bead core, a width $W1$ of one of the layers, which is located at an innermost side in the tire radial direction, and a width $W2$ of another of the layers, which is located at an outermost side in the tire radial direction, satisfy relationships $W1>W2$ and $W2 \leq 0.5 \times W0$. The layer of the plurality of layers, having the maximum width $W0$, is located toward the inside in the tire radial direction of a center position of the bead core in the tire radial direction. When a polygonal shape formed by common tangent lines of the plurality of circumferential portions of the bead wire in a meridian cross-section is defined as an outer shape of the bead wire, internal angles $\alpha$, $\beta$ of corner portions located on opposite ends of one side of the outer shape, which is located toward the inside in the tire radial direction, satisfy relationships $\alpha > 90°$ and $\beta > 90°$. A peripheral length $L0$ of the outer shape, a length $L1$ of the side of the outer shape, which is located toward the inside in the tire radial direction, a length $L2$ of another side of the outer shape, which is connected to the side located toward the inside in the tire radial direction and which is inclined at a bead toe, and a length $L3$ of another side of the outer shape, which is connected to the side located toward the inside in the tire radial direction and which is inclined at a bead heel satisfy relationships $0.25 \leq (L1+L2)/L0 \leq 0.40$ and $1.0 \leq (L1+L2)/(2 \times L3) \leq 2.5$. The carcass layer includes a body portion extending from the tread portion through each of the sidewall portions to each of the bead portions, and a folded back portion folded at each of the bead portions and curved along a periphery of the bead core, and extending toward each of the sidewall portions while contacting the body portion from an outer end position of the bead core in the tire radial direction.

According to an embodiment of the present technology, since the bead core has the foregoing structure, in the bead core as a whole, the number of turns of the bead wire can be reduced, and the number of turns of the bead wire can be more sufficiently ensured at the inner side in the tire radial direction than at the center position of the bead core in the tire radial direction. Thus, sufficient performance as the bead core can be maintained, and the tire can use the reduced amount of bead wire and be reduced in weight while securing tire durability. At this time, since the outer shape of the bead core (in particular, the relationship between the peripheral length $L0$ and the lengths $L1$ to $L3$) is set as described above, the lengths $L1$ and $L2$ largely contributing to rim disengagement during run-flat traveling can be sufficiently secured, and thus rim disengagement resistance can be improved.

According to an embodiment of the present technology, when an auxiliary line $A0$ being perpendicular to the carcass layer through an intersection point between an outline of an outer surface of the sidewall portion and a straight line separated from the bead toe by 20 mm toward the outside in the tire radial direction and extending in parallel with the tire radial direction, an auxiliary line $A1$ separated from the auxiliary line $A0$ by 5 mm toward the inside in the tire radial direction and being parallel with the auxiliary line $A0$, and an auxiliary line $A2$ separated from the auxiliary line $A0$ by 5 mm toward the outside in the tire radial direction and being parallel with the auxiliary line $A0$ are drawn in the meridian cross-section, a cross-sectional area $SR$ of a portion of the side reinforcing layer, which is present between the auxiliary line $A1$ and the auxiliary line $A2$, and an area $SB$ of a closed region formed by the body portion and the folded back portion of the carcass layer preferably satisfy a relationship $0.4 \leq SB/SR \leq 2.5$. As a result, the cross-sectional structure of a region near a portion contactable with a rim flange is favorably obtained, and the rim disengagement caused by a rotational force about the portion contacting the rim flange can be prevented, which is advantageous to increase the rim disengagement resistance.

According to an embodiment of the present technology, in the meridian cross-section, the peripheral length L0 of the outer shape of the bead core and a tire cross-sectional width K on an auxiliary line A0 being perpendicular to the carcass layer through an intersection point between an outline of an outer surface of the sidewall portion and a straight line separated from the bead toe by 20 mm toward the outside in the tire radial direction and extending in parallel with the tire radial direction preferably satisfy a relationship $1.2 \leq L0/K \leq 5.0$ As a result, the cross-sectional structure of a region near a portion contactable with a rim flange is favorably obtained, and the rim disengagement caused by the rotational force about the portion contacting the rim flange can be prevented, which is advantageous to increase the rim disengagement resistance.

According to an embodiment of the present technology, a ratio of a total area of rubber present in the closed region to an area of the closed region formed by the body portion and the folded back portion of the carcass layer is preferably from 0.1% to 15%. As a result, only the bead core is substantially present in the closed region formed by the body portion and the folded back portion of the carcass layer, which is advantageous to reduce the tire weight.

At this time, a filler layer is preferably provided toward the outside of the main body portion and the folded back portion of the carcass layer in the tire lateral direction. As a result, even when no conventional bead filler layer is substantially present between the body portion and the folded back portion of the carcass layer, the cross-sectional structure of the tire (in particular, a rubber gauge from the bead portion to the sidewall portion) can be appropriately provided, which is advantageous to improve the tire durability and the rim disengagement resistance. Note that since the filler layer is only a member provided as a substitute for a conventional bead filler layer, the tire weight is not increased even when the filler layer is provided, compared with a tire provided with a conventional bead filler layer.

Further, when an auxiliary line A0 being perpendicular to the carcass layer through an intersection point between an outline of an outer surface of the sidewall portion and a straight line separated from the bead toe by 20 mm toward the outside in the tire radial direction and extending in parallel with the tire radial direction, an auxiliary line A1 separated from the auxiliary line A0 by 5 mm toward the inside in the tire radial direction and being parallel with the auxiliary line A0, and an auxiliary line A2 separated from the auxiliary line A0 by 5 mm toward the outside in the tire radial direction and being parallel with the auxiliary line A0 are drawn in the meridian cross-section, a cross-sectional area SF of a portion of the filler layer, which is present between the auxiliary line A1 and the auxiliary line A2, and an area SB of a closed region formed by the body portion and the folded back portion of the carcass layer preferably satisfy a relationship $0.6 \leq SB/SF \leq 2.4$. As a result, even when only the bead core is substantially present in the closed region formed by the body portion and the folded back portion of the carcass layer, the cross-sectional structure of a region near a portion contactable with a rim flange is favorably obtained, and the rim disengagement caused by the rotational force about the portion contacting the rim flange can be prevented, which is advantageous to increase the rim disengagement resistance.

Furthermore, when an auxiliary line A0 being perpendicular to the carcass layer through an intersection point between an outline of an outer surface of the sidewall portion and a straight line separated from the bead toe by 20 mm toward the outside in the tire radial direction and extending in parallel with the tire radial direction, an auxiliary line A1 separated from the auxiliary line A0 by 5 mm toward the inside in the tire radial direction and being parallel with the auxiliary line A0, and an auxiliary line A2 separated from the auxiliary line A0 by 5 mm toward the outside in the tire radial direction and being parallel with the auxiliary line A0 are drawn in the meridian cross-section, a cross-sectional area SR of a portion of the side reinforcing layer, which is present between the auxiliary line A1 and the auxiliary line A2, a cross-sectional area SF of a portion of the filler layer, which is present between the auxiliary line A1 and the auxiliary line A2, and an area SB of a closed region formed by the body portion and the folded back portion of the carcass layer preferably satisfy a relationship $0.3 \leq SB/(SR+SF) \leq 2.0$. As a result, even when only the bead core is substantially present in the closed region formed by the body portion and the folded back portion of the carcass layer, the cross-sectional structure of a region near a portion contactable with a rim flange is favorably obtained, and the rim disengagement caused by the rotational force about the portion contacting the rim flange can be prevented, which is advantageous to increase the rim disengagement resistance.

According to an embodiment of the present technology, an average diameter of the bead wire is preferably from 0.8 mm to 1.8 mm. As just described, the average diameter of the bead wire is set in an appropriate range, and thus, advantageously, reduction in tire weight and improvement in rim disengagement resistance are achieved in a compatible manner.

According to an embodiment of the present technology, a total cross-sectional area of the bead wire is preferably from 10 $mm^2$ to 50 $mm^2$. As just described, the total cross-sectional area of the bead wire is set in an appropriate range, and thus, advantageously, reduction in tire weight and improvement in rim disengagement resistance are achieved in a compatible manner.

According to an embodiment of the present technology, the length L2 of the side of the outer shape of the bead core, which is connected to the side located toward the inside in the tire radial direction and which is inclined at the bead toe, is preferably from 1.5 mm to 8 mm. As a result, the bead core is further improved in shape, and advantageously, reduction in tire weight and improvement in rim disengagement resistance are achieved in a compatible manner.

According to an embodiment of the present technology, the length L1 of the side of the outer shape of the bead core, which is located toward the inside in the tire radial direction, is preferably from 2 mm to 10 mm. As a result, the bead core is further improved in shape, and advantageously, reduction in tire weight and improvement in rim disengagement resistance are achieved in a compatible manner.

In the present technology, dimensions are measured with the tire mounted on a regular rim and inflated to a regular internal pressure. "Regular rim" is a rim defined by a standard for each tire according to a system of standards that includes standards on which tires are based, and refers to a "standard rim" in the case of JATMA (Japan Automobile Tyre Manufacturers Association, Inc.), refers to a "design rim" in the case of TRA (The Tire and Rim Association, Inc.), and refers to a "measuring rim" in the case of ETRTO (European Tire and Rim Technical Organization). In the system of standards, including standards with which tires comply, "regular internal pressure" is air pressure defined by each of the standards for each tire and is referred to as "maximum air pressure" in the case of JATMA, the maximum value being listed in the table "TIRE LOAD LIMITS AT VARIOUS COLD INFLATION PRESSURES" in the case of TRA, and is "INFLATION PRESSURE" in the case of ETRTO. However, "regular internal pressure" is 180 kPa in a case where a tire is a tire for a passenger vehicle.

DETAILED DESCRIPTION

Configurations of embodiments of the present technology will be described in detail below with reference to the accompanying drawings.

Figure 1:
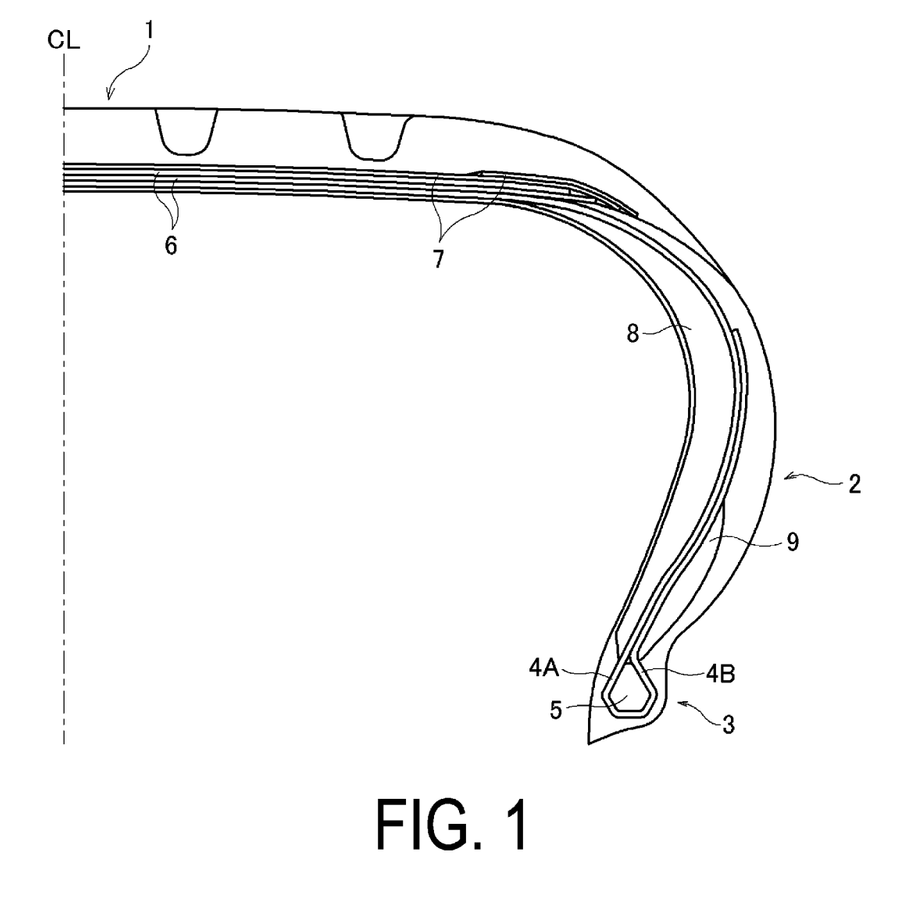
FIG. 1 is a half cross-sectional view taken along a meridian of a pneumatic tire according to an embodiment of the present technology.

As illustrated in FIG. 1, the pneumatic tire of an embodiment of the present technology includes an annular tread portion 1 extending in the tire circumferential direction, a pair of sidewall portions 2 disposed on both sides of the tread portion 1, and a pair of bead portions 3 disposed toward the inside of the sidewall portions 2 in the tire radial direction. Note that "CL" in FIG. 1 denotes the tire equator.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. In the following description, a portion of the carcass layer, which extends from the tread portion 1 through each of the sidewall portions 2 to each of the bead portions 3 is referred to as a body portion 4A, a portion of the carcass layer, which is folded back around the bead core 5 at each of the bead portions 3 to extend toward each of the sidewall portions 2, is indicated by 4B.

Figure 2:
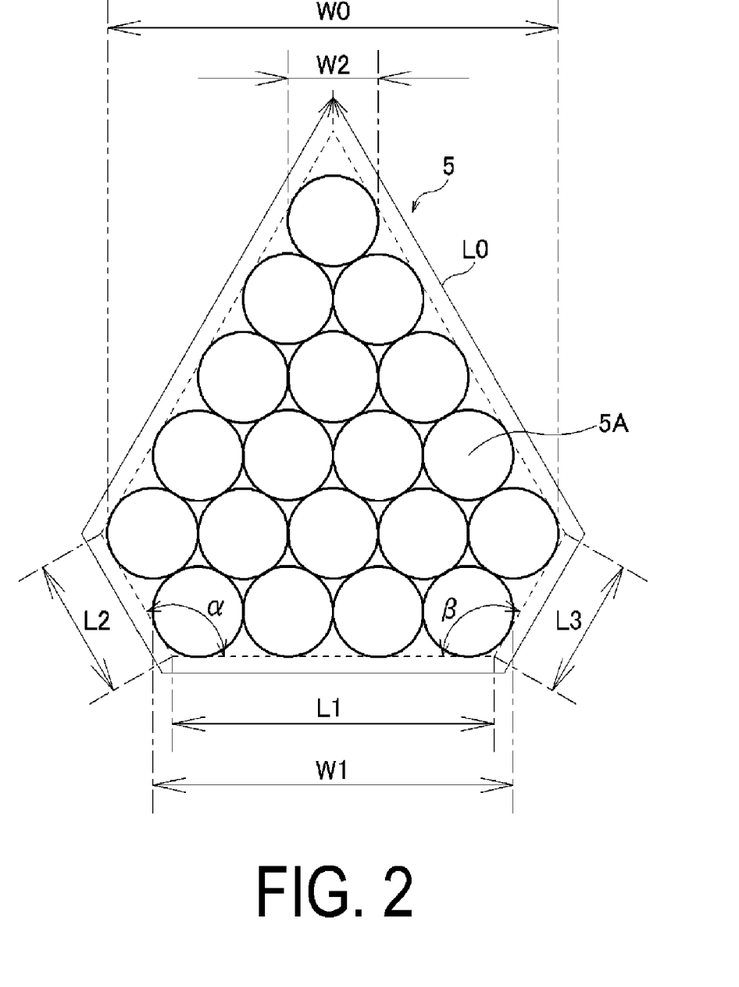
FIG. 2 is an explanatory diagram schematically illustrating a multilayer structure of a bead wire according to an embodiment of the present technology.

As illustrated in an enlarged view of FIG. 2, the bead core 5 is formed of at least one bead wire 5A wound in the tire circumferential direction, and plural circumferential portions of the bead wire 5A form plural wires aligned in the tire lateral direction and plural layers overlapping in the tire radial direction. In the present technology, as long as the plural circumferential portions of the bead wire 5A form the plural wires and the plural layers in the meridian cross-section as described above, even a so-called single winding structure in which the single bead wire 5A is continuously wound or even a so-called layer winding structure in which the plural bead wires 5A are aligned in parallel may be applied. In the illustrated example, a structure is provided in which a total of six layers: a layer including four circumferential portions; a layer including five circumferential portions; a layer including four circumferential portions; a layer including three circumferential portions; a layer including two circumferential portions; and a layer including one circumferential portion are stacked in the mentioned order from the innermost side in the tire radial direction. Note that in the following description, the structure is referred to as a "4+5+4+3+2+1 structure". Likewise, in the following description, the multilayer structure of the bead wire 5A is expressed in a similar format such that the number of wires included in respective layers are connected with a "+" in order from the innermost layer in the tire radial direction. Furthermore, in the bead core 5 of the illustrated example, the bead wire 5A is disposed to form a multilayer structure in a trefoil shape. Note that "multilayer structure in a trefoil shape" is a stacking method in which the centers of the three circumferential portions in contact with each other form a substantially regular triangle, and is a multilayer structure also referred to as a hexagonal filling arrangement and having a high filling rate.

At this time, for each of the bead cores 5, the relationships $W1 > W2$ and $W2 \leq 0.5 \times W0$ are satisfied when the maximum width of the bead core 5 is W1, the width of the innermost layer in the tire radial direction is W1, and the width of the outermost layer in the tire radial direction is W2. Additionally, the layer having the maximum width W0 of the plural layers configuring the bead core 5 is located toward the inside in the tire radial direction of the center position of the bead core 5 in the tire radial direction. Specifically, each of the bead cores 5 is formed in a tapered shape such that the width of the bead core 5 decreases from a portion located toward the inside in the tire radial direction of the center position in the tire radial direction and having the maximum width toward the outer side in the tire radial direction (herein, such a shape may be referred to as a "radially outward wedge shape"). Note that as illustrated, each of the widths W0 to W2 is a length extending in the tire lateral direction and defined between outer ends of the outer circumferential portions in the tire lateral direction, which are located at opposite outer sides of each of the layers in the tire lateral direction.

Further, the outer shape of each of the bead cores 5 has a polygonal shape formed by common tangent lines (dashed lines in the diagram) of the plural circumferential portions of the bead wire 5A in the meridian cross-section. In this case, internal angles $\alpha$, $\beta$ of corner portions located on opposite ends of one side of the outer shape, which is located toward the inside in the tire radial direction, satisfy the relationships $\alpha > 90°$ and $\beta > 90°$, and preferably satisfy the relationships $100° \leq \alpha \leq 150°$ and $100° \leq \beta \leq 150°$. Furthermore, the peripheral length of the outer shape (the sum of the lengths of all sides of the polygon formed by the common tangent lines of the plural circumferential portions of the bead wire 5A) is L0, the length of one of the sides of the outer shape, which is located toward the inside in the tire radial direction is L1, the length of another of the sides of the outer shape, which is connected to the side located toward the inside in the tire radial direction and which is inclined at the bead toe side is L2, and the length of another of the sides of the outer shape, which is connected to the side located toward the inside in the tire radial direction and which is inclined at the bead heel side is L3. In this case, the lengths satisfy the relationships $0.25 \leq (L1+L2)/L0 \leq 0.40$ and $1.0 \leq (L1+L2)/(2 \times L3) \leq 2.5$, and preferably satisfy the relationships $0.28 \leq (L1+L2)/L0 \leq 0.36$ and $1.1 \leq (L1+L2)/(2 \times L3) \leq 2.0$.

The carcass layer 4 is folded back around the bead core 5 as described above; however, since the bead core 5 of the present technology has a special shape (the radially toward the outside side wedge shape) as described above, the carcass layer 4 is bent along the periphery of the bead core 5. For example, in the illustrated example, the aforementioned settings are satisfied by the bead core 5, and thus the cross-sectional shape is substantially pentagonal. Accordingly, the carcass layer 4 extending along the periphery of the bead core 5 is also bent into a substantially pentagonal shape. Moreover, a portion of the folded back portion 4B of the carcass layer 4, which is located toward the outside of a radially outward end of the bead core 5 in the tire radial direction extends along the body portion 4A of the carcass layer 4 toward each of the sidewall portions 2 while contacting the body portion 4A of the carcass layer 4. As a result, the body portion 4A and the folded back portion 4B of the carcass layer 4 form a closed region that surrounds the bead core 5.

Belt layers 6 of plural layers (in the illustrated example, two layers) are embedded on the outer circumferential side of the carcass layer 4 in the tread portion 1. Each of the belt layers 6 includes plural reinforcing cords inclined with respect to the tire circumferential direction. The reinforcing cords are arranged such that the reinforcing cords intersect one another between the layers. The belt layers 6 are set such that an inclination angle of the reinforcing cords with respect to the tire circumferential direction ranges, for example, from 10° to 40°. In addition, belt reinforcing layers 7 are provided on the outer circumferential side of the belt layers 6. In particular, in the illustrated example, two layers are provided: a full cover layer covering the entire width of the belt layers 6 and an edge cover layer covering only either end of the belt reinforcing layer 7. The belt reinforcing layers 7 include organic fiber cords oriented in the tire circumferential direction. The belt reinforcing layers 7 are set such that an angle of the organic fiber cords with respect to the tire circumferential direction ranges, for example, from 0° to 5°.

A side reinforcing layer 8 formed in a crescent shape in cross-section is disposed toward the inside of the carcass layer 4 in the sidewall portion 2 in the tire lateral direction. The side reinforcing layer 8 is made of rubber harder than another rubber configuring the sidewall portion 2. Specifically, the rubber configuring the side reinforcing layer 8 has a JIS-A hardness of, for example, 70 to 80 and a modulus of, for example, 9.0 Mpa to 10.0 MPa at an elongation of 100%. The side reinforcing layer 8 having such physical properties supports, based on the rigidity thereof, a load and allows for run-flat traveling when the tire is punctured.

In the illustrated example, a filler layer 9 is disposed toward the outside of the carcass layer 4 (the body portion 4A and the folded back portion 4B) in the sidewall portion 2 in the tire lateral direction. The filler layer 9 is a layer that can be optionally disposed as described below in a case where only the bead core 5 is provided in the closed region formed by the body portion 4A and the folded back portion 4B of the carcass layer 4 (in a case where no conventional bead filler is present).

In the present technology, the bead core 5 has a special shape (the radially outward side wedge shape) as described above. Accordingly, in the bead core 5 as a whole, the number of turns of the bead wire 5A can be reduced, and the number of turns of the bead wire 5A can be more sufficiently ensured at the inner side in the tire radial direction than at the center position of the bead core 5 in the tire radial direction. Thus, sufficient performance can be maintained as the bead core 5, and the tire can use the reduced amount of bead wire 5A and be reduced in weight while securing tire durability. At this time, since the outer shape of the bead core 5 (in particular, the relationship between the peripheral length L0 and the lengths L1 to L3) is set as described above, the lengths L1 and L2 largely contributing to rim disengagement during run-flat traveling can be sufficiently secured, and thus rim disengagement resistance can be improved.

In the aforementioned structure, when the widths W0, W1, and W2 do not satisfy the relationships described above, the shape of the bead core 5 is inappropriate, and thus the shape of the bead portion 3 cannot be stabilized. In particular, when the relationships W1≤W2 and W2>0.5×W0 are established, the width of an upper end of the bead core 5 is increased. Accordingly, the rigidity of a region near a portion contactable with a rim flange increases, which makes it difficult to prevent rim disengagement caused by a rotational force about the portion contacting the rim flange. Consequently, the rim disengagement resistance deteriorates. When the internal angles α, β are equal to or smaller than 90°, the number of turns of the bead wire 5A cannot be sufficiently reduced, and thus an effect of reducing the tire weight decreases. When the internal angles α and β are equal to or smaller than 90°, portions of the bead wire 5A, which are located on the opposite ends of the side of the outer shape, which is located toward the inside in the tire radial direction are easily affected by a flow of rubber during vulcanization, and thus, it is difficult to maintain the bead core 5 in a good shape after vulcanization. When the relationships described above are not satisfied by the peripheral length L0 and the lengths L1 to L3, reduction in tire weight and improvement in rim disengagement resistance cannot be achieved in a compatible manner. In particular, when the following relationships are established: 0.25>(L1+L2)/L0 and 1.0>(L1+L2)/(2×L3), the rim disengagement deteriorates. When the following relationships are established: (L1+L2)/L0>0.40 and (L1+L2)/(2×L3)>2.5, the tire weight cannot be reduced.

The peripheral length L0 and the lengths L1 to L3 may satisfy the relationship described above. Of the lengths, the length L1 of the side of the outer shape of the bead core, which is located toward the inside in the tire radial direction, and the length L2 of the side of the outer shape of the bead core, which is connected to the side located toward the inside in the tire radial direction and which is inclined at the bead toe side largely contribute to the rim disengagement during run-flat traveling. Thus, the length L2 is preferably set at from 1.5 mm to 8 mm, and is more preferably set at from 2 mm to 5 mm, and the length L1 is preferably set at from 2 mm to 10 mm, and is more preferably set at from 2.5 mm to 7 mm. When the length L2 is less than 1.5 mm, an effect of improving the rim disengagement resistance is limited. When the length L2 is greater than 8 mm, the effect of reducing the tire weight is limited. When the length L1 is less than 2 mm, the effect of improving the rim disengagement resistance is limited. When the length L1 is greater than 10 mm, the effect of reducing the tire weight is limited.

The structure of the bead wire 5A itself is not particularly limited, but an average diameter of the bead wire 5A is preferably from 0.8 mm to 1.8 mm, more preferably from 1.0 mm to 1.6 mm, and even more preferably from 1.1 mm to 1.5 mm in view of achieving reduction in tire weight and improvement in rim disengagement resistance in a compatible manner. Additionally, the total cross-sectional area of the bead wire 5A (the sum of the cross-sectional areas of the circumferential portions of the bead wire 5A included in the meridian cross-section of each of the bead cores 5) is preferably from 10 $mm^2$ to 50 $mm^2$, more preferably from 15 $mm^2$ to 48 $mm^2$, and even more preferably from 20 $mm^2$ to 45 $mm^2$. When the average diameter of the bead wire 5A is smaller than 0.8 mm, the effect of improving the rim disengagement resistance is limited. When the average diameter of the bead wire 5A is greater than 1.8 mm, the effect of reducing the tire weight is limited. When the total cross-sectional area of the bead wire 5A is smaller than 10 mm$^2$, the effect of improving the rim disengagement resistance is limited. When the total cross-sectional area of the bead wire 5A is greater than 50 mm$^2$, the effect of reducing the tire weight is limited.

As described above, the closed region is formed by the body portion 4A and the folded back portion 4B of the carcass layer 4. A conventional bead filler or a tire component similar to the conventional bead filler (a member disposed toward the outside of the bead core 5 in the tire radial direction and enclosed by the body portion 4A and the folded back portion 4B of the carcass layer 4 to increase rigidity of a region from the bead portion 3 to the sidewall portion 2) may be disposed in the closed region. Alternatively, to effectively reduce the tire weight, only the bead core 5 may be substantially present in the closed region as illustrated. In other words, even in the presence of an insulating rubber that covers the bead wire 5A or a rubber that fills a slight gap formed between the bead core 5 and the carcass layer 4, it is preferable that a bead filler having a large volume as in a conventional pneumatic tire is not used. In particular, an occupancy ratio of the rubber in the closed region, i.e., a ratio of the total area a of the rubber present in the closed region to the area A of the closed region in the meridian cross-section (a/A×100%) is preferably 0.1% to 15%. When the occupancy ratio of the rubber in the closed region is greater than 15%, the present tire is substantially equivalent to a conventional pneumatic tire including a bead filler, and thus it is difficult to further increase the effect of reducing the tire weight. Note that since an insulating rubber or the like covering the bead wire 5A is always present in the tire structure, the occupancy ratio of the rubber in the closed region is basically not below 0.1%.

When only the bead core 5 is substantially present in the closed region as just described, the filler layer 9 can be provided as described above. The filler layer 9 is different from a bead filler provided between the body portion 4A and the folded back portion 4B of the carcass layer 4 in a conventional pneumatic tire in that the filler layer 9 is adapted to appropriately secure the rigidity of the sidewall portion 2 in conjunction with the aforementioned side reinforcing layer 8. Even when such a filler layer 9 is provided, the filler layer 9 is only a member provided as a substitute for a conventional bead filler layer. Consequently, the tire weight is not increased compared with a tire provided with a conventional bead filler layer. In addition, to more effectively reduce the tire weight, the structure or the like of the filler layer 9 may be associated with the side reinforcing layer 8. For example, the following relationships of the cross-sectional area S2 of the filler layer 9 and the hardness H2 of the filler layer 9 to the cross-sectional area S1 of the side reinforcing layer 8 and the hardness H1 of the side reinforcing layer 8 may satisfy the relationship 0.15≤(S2× H2)/(S1×H1)≤0.60. As a result, the tire can appropriately obtain a reinforcing effect of the filler layer 9 while reducing the used amount of the filler layer 9 to limit influence on the tire weight.

The specific shape of the bead core 5 is not particularly limited as long as the widths W0, W1, and W2 and the lengths L0 to L3 satisfy the relationships described above. For example, the shapes illustrated in FIG. 3 can be employed. In the examples of FIG. 3, any of the widths W0, W1, and W2 satisfy the relationships described above, and thus the "radially outward side wedge shape" of the present technology applies. In addition, the lengths L0 to L3 satisfy the relationships described above. Specifically, multi-stacking in a trefoil shape of a 3+4+3+2+1 structure is provided in FIG. 3A, and multi-stacking in a trefoil shape of a 3+4+3+2 structure is provided in FIG. 3B. Multi-stacking in a trefoil shape of a 3+4+4+3+2+1 structure is provided in FIG. 3C. A 3+4+4+3+2+1 structure is provided in FIG. 3D in which the second layer from the outer side in the tire radial direction and the layer located adjacent to and toward the inside of the second layer in the tire radial direction are stacked in series (in a stacking manner such that the circumferential portions located side by side in the tire radial direction are stacked vertically in the tire lateral direction).

In any of the structures illustrated in FIG. 3, at least a portion of the bead wire 5A is multi-stacked in a trefoil shape, and thus the bead wire 5A can be densely disposed with a filling rate of the bead wire 5A increased compared with a bead wire multi-stacked in series as a whole. As a result, rigidity and pressure resistance performance of the bead portion 3 can be appropriately ensured, and the tire can be reduced in weight while maintaining running performance, and thus such performances can be attained in a well-balanced manner. Focusing on the filling rate of the bead wire 5A, preferably, the bead wire 5A is entirely multi-stacked in a trefoil shape as in FIGS. 3A to 3C.

Figure 3A:
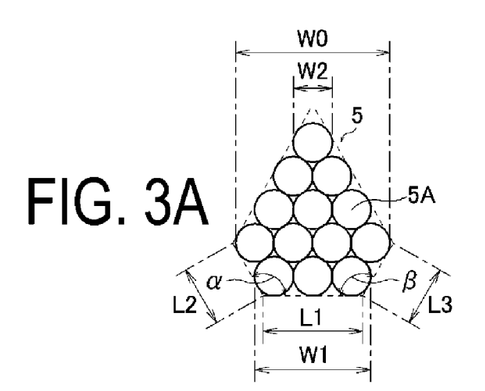
FIGS. 3A to 3D are explanatory diagrams schematically illustrating multilayer structures of a bead wire according to embodiments of the present technology.
Figure 3B:
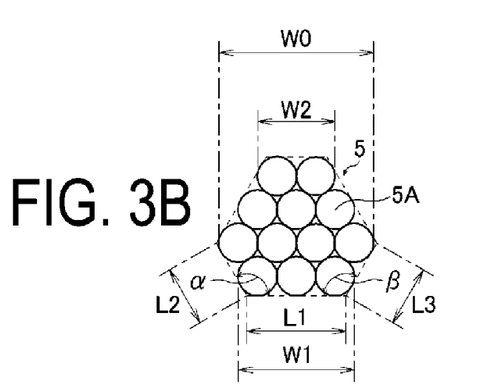

Additionally, for the shape of the bead core 5, in order to increase the stability of the overall shape of the bead core 5, the overall shape of the bead core 5 is preferably designed to be linearly symmetrical with respect to the center of the bead core 5 in the tire lateral direction. From this perspective, the shapes as in FIGS. 3A, 3B, and 3D are preferable.

The various shapes of the bead cores 5 can be appropriately selected based on the aforementioned various perspectives in consideration of the overall structure of the pneumatic tire or in consideration of characteristics to be emphasized.

As described above, in a case where the rigidity of a region near a portion contactable with the rim flange increases, the pneumatic tire including the side reinforcing layer 8 is structured such that a force that rotates the bead portion toward the tire inner side about the portion contacting the rim flange may be generated. Accordingly, to optimize the structure of the region near the portion contactable with the rim flange is effective to increase the rim disengagement resistance. In other words, when auxiliary lines A0, A1, and A2 are drawn in the meridian cross-section as illustrated in the enlarged views of FIGS. 4A-4B, the structure of a region between the auxiliary line A1 and the auxiliary line A2 (the hatched portion in FIG. 4A, which will be hereinafter referred to as a rim flange contact region) is preferably optimized wherein the auxiliary line A0 is perpendicular to the carcass layer through an intersection point P between a straight line separated from the bead toe toward the outside by 20 mm in the tire radial direction and extending in parallel with the tire radial direction, and an outline of the outer surface of the sidewall portion; the auxiliary line A1 is separated from the auxiliary line A0 by 5 mm toward the inside in the tire radial direction and is parallel with the auxiliary line A0; and the auxiliary line A2 is separated from the auxiliary line A0 by 5 mm toward the outside in the tire radial direction and is parallel with the auxiliary line A0.

Figure 4A:
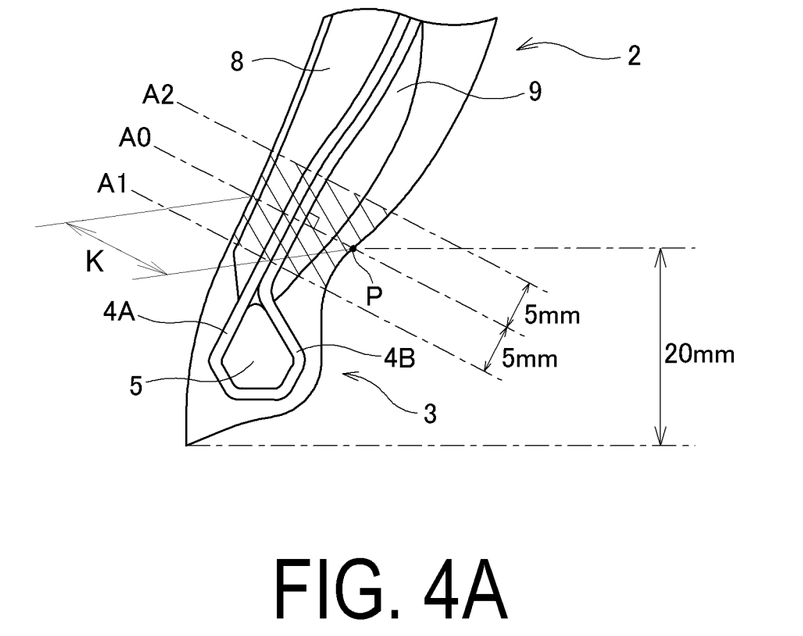
FIGS. 4A-4B are enlarged explanatory diagrams illustrating a location near the bead portion of FIG. 1.
Figure 4B:
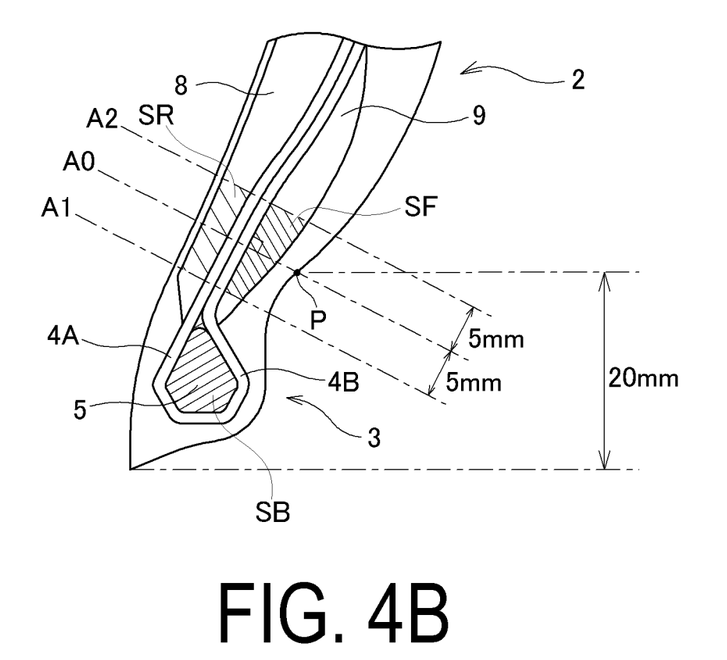

Specifically, the cross-sectional area SR of a portion of the side reinforcing layer 8, which is included in the rim flange contact region, and the area SB of the closed region formed by the body portion 4A and the folded back portion 4B of the carcass layer 4 preferably satisfy the relationship $0.4 \leq SB/SR \leq 2.5$, and more preferably satisfy the relationship $0.7 \leq SB/SR \leq 2.0$. Additionally, the tire cross-sectional width K on the auxiliary line A0 and the peripheral length L0 of the outer shape of the bead core 5 preferably satisfy the relationship $1.2 \leq L0/K \leq 5.0$, and more preferably satisfy the relationship $1.4 \leq L0/K \leq 4.5$. As a result, the cross-sectional structure of the rim flange contact region is favorably obtained, and the rim disengagement caused by the rotational force about the portion contacting the rim flange can be prevented, which is advantageous to increase the rim disengagement resistance. The greater the cross-sectional area SR and the tire cross-sectional width K are, the greater the rigidity of the rim flange contact region is, and thus the rotational force about the portion contacting the rim flange is easily generated. The greater the area SB and the peripheral length L0 are, the larger the size of the bead core 5 is, and thus the effect of reducing the tire weight is limited.

As illustrated, the same applies to a case where the filler layer 9 is provided. The cross-sectional area SF of a portion of the filler layer 9, which is included in the rim flange contact region, and the area SB of the closed region formed by the body portion and the folded back portion of the carcass layer preferably satisfy the relationship $0.6 \leq SB/SF \leq 2.4$, and more preferably satisfy the relationship $0.7 \leq SB/SF \leq 2.1$. Moreover, the cross-sectional area SR of the portion of the side reinforcing layer 8, which is included in the rim flange contact region, the cross-sectional area SF of the portion of the filler layer 9, which is included in the rim flange contact region, and the area SB of the closed region formed by the body portion 4A and the folded back portion 4B of the carcass layer 4 preferably satisfy the relationship $0.3 \leq SB/(SR+SF) \leq 2.0$, and more preferably satisfy the relationship $0.4 \leq SB/(SR+SF) \leq 1.7$. As a result, the cross-sectional structure of the rim flange contact region is favorably obtained, and the rim disengagement caused by the rotational force about the portion contacting the rim flange can be prevented, which is advantageous to increase the rim disengagement resistance. The greater the cross-sectional area SF and the cross-sectional area SR are, the greater the rigidity of the rim flange contact region is, and thus the rotational force about the portion contacting the rim flange is easily generated. The greater the area SB is, the larger the size of the bead core 5 is, and thus the effect of reducing the tire weight is limited.

The structures of the respective components described above can be combined and applied as appropriate. In any case, in the pneumatic tire structured as described above, the structure of the bead portion 3 is improved, and thus the tire can be reduced in weight while maintaining durability, and the rim disengagement resistance can be improved.

EXAMPLE

Thirty-one types of pneumatic tires according to Conventional Example 1, Comparative Examples 1 to 6, and Examples 1 to 24 were manufactured. Each of the tires had a tire size of 235/50R18 and the basic structure illustrated in FIG. 1, and was set as listed in Tables 1 to 3 for: the structure of a bead core, the presence/absence of a bead filler, the maximum width W0 of the bead core, the width W1 of the innermost layer of the bead core in the tire radial direction, the width W2 of the outermost layer of the bead core in the tire radial direction, the inner angles α, β of corner portions located on the opposite ends of one side of the outline of a bead wire, which is located toward the inside in the tire radial direction, the peripheral length L0 of the outer shape, the length L1 of the side of the outer shape, which is located toward the inside in the tire radial direction, the length L2 of another side of the outer shape, which is connected to the side located toward the inside in the tire radial direction and which is inclined at the bead toe, the length L3 of another side of the outer shape, which is connected to the side located toward the inside in the tire radial direction and which is inclined at the bead heel, the expression (L1+L2)/L0, the expression (L1+L2)/(2×L3), the area SB of a closed region formed by a body portion and a folded back portion of a carcass layer, the cross-sectional area SR of a portion of a side reinforcing layer, which is included in a rim flange contact region, the ratio SB/SR, the tire cross-sectional width K on the auxiliary line A0, the ratio L0/K, the occupancy ratio of rubber, the presence or absence of a filler layer disposed toward the outside of the carcass layer in the tire lateral direction, the cross-sectional area SF of a portion of the filler layer, which is included in the rim flange contact region, the ratio SB/SF, the expression SB/(SR+SF), the average diameter of the bead wire, and the total cross-sectional area of the bead wire.

Figure 5A:
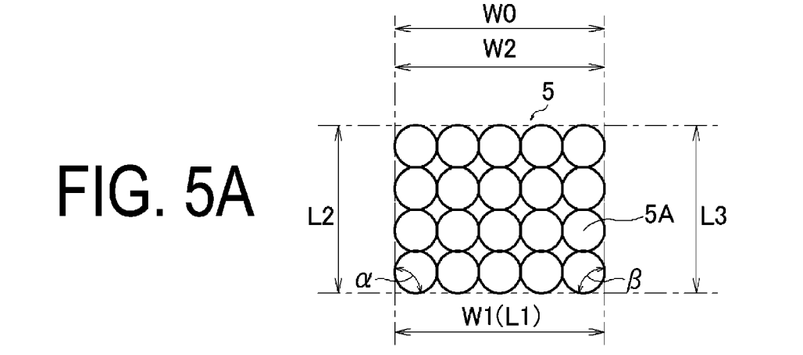
FIGS. 5A TO 5C are explanatory diagrams schematically illustrating structures of a bead of Conventional Examples and Comparative Examples.
Figure 5B:
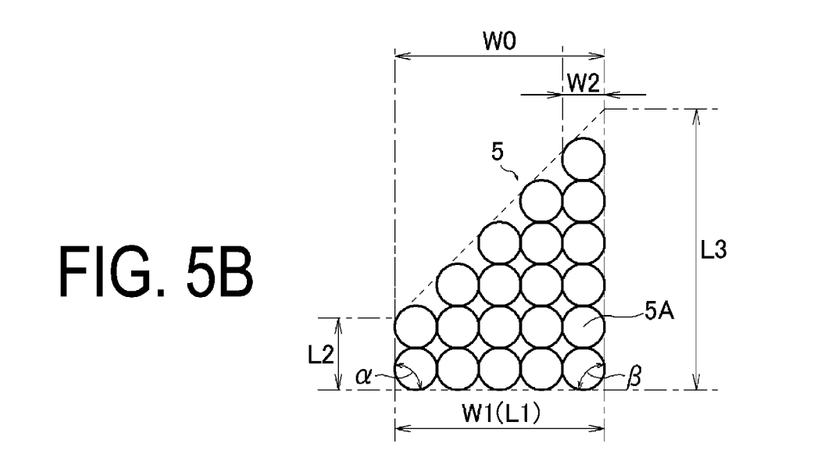
Figure 5C:
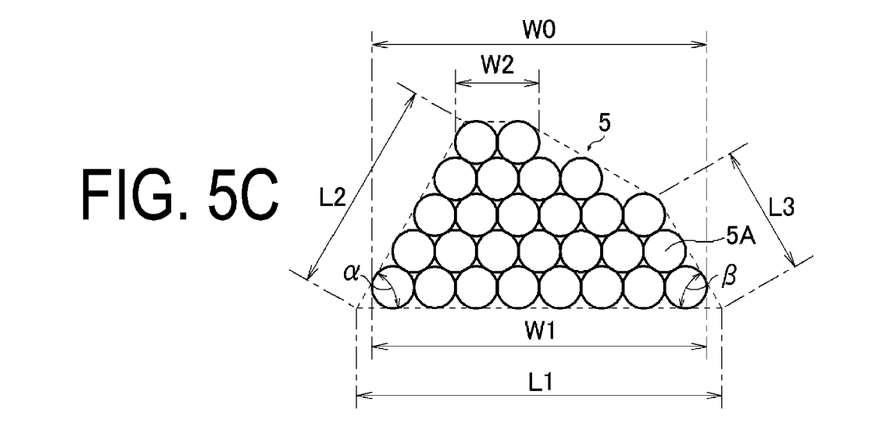

The numbers of the corresponding diagrams are indicated in the columns of "Bead core structure" in Tables 1 to 3. Note that even when the structure does not completely match the illustrated structure, for reference, the number of the diagram illustrating a similar shape is indicated with an "*" attached (it is basically interpreted that the structure in which L2=L3 is established is similar to the structure of "FIG. 2" and that the structure in which L2≠L3 is established is similar to the structure of "FIG. 3C"). In addition, Conventional Example 1 is an example using a conventional typical bead core, and the bead core has a 5+5+5+5 structure in which a bead wire is layered in series as illustrated in FIG. 5A. The bead core of Comparative Example 1 has a 5+5+4+3+2+1 structure in which the bead wire is layered in series as illustrated in FIG. 5B. The bead core of Comparative Example 2 has an 8+7+6+4+2 structure in which the bead wire is layered in a trefoil shape as illustrated in FIG. 5C.

For the pneumatic tires, the tire mass, the rim disengagement resistance, and the run-flat durability were evaluated in accordance with the evaluation methods described below. Results of the evaluation are indicated in Tables 1 to 3.

Tire Mass

For each test tire, the masses of five tires were measured, and an average value of the tires was calculated. Evaluation results are expressed as index values with the inverse of Conventional Example 1 being assigned the index value of 100. Higher index values indicate smaller tire mass. Rim disengagement resistance Each of the test tires was assembled on a wheel having a rim size 18×7.5 J and inflated to an air pressure of 0 kPa, and was mounted on a test vehicle with an engine displacement of 2000 cc. A vehicle stopping test was repeatedly performed as below (J turn test). After being allowed to access to a flat, asphalt road surface while traveling straight thereon, the test vehicle was suddenly turned right with a pivot radius 8 m and a pivot angle of 180 degrees. At this time, the speed at the time of traveling straight was gradually increased, and the speed at which rim disengagement occurred was measured, and thus the rim disengagement resistance was evaluated. Specifically, after increasing the speed from an initial speed of 35 km/h to 40 km/h in the first stage, the speed was increased by 2 km/h. Evaluation results are expressed as index values with Conventional Example 1 being assigned the index value of 100. Larger index values indicate more superior rim disengagement resistance.

Run-flat Durability

Each of the test tires was assembled on a wheel having a rim size of 18×7.5 J and allowed to run on a drum testing machine under drum durability test conditions for run-flat tires, which are described in ECE30, and the running distance until the tire was damaged or fractured was measured. Evaluation results are expressed as index values with Conventional Example 1 being assigned the index value of 100. Larger index values indicate superior run-flat durability.

TABLE 1

|  |  | Conventional Example 1 | Comparative Example 1 | Comparative Example 2 | Example 1 |
|---|---|---|---|---|---|
| Bead core structure |  | FIG. 5A | FIG. 5B | FIG. 5C | FIG. 2 |
| Presence/absence of bead filler |  | Yes | No | Yes | No |
| W0 | mm | 6 | 6 | 10 | 6 |
| W1 | mm | 6 | 6 | 10 | 4.8 |
| W2 | mm | 6 | 1.2 | 2.4 | 1.2 |
| α | ° | 90 | 90 | 60 | 120 |
| β | ° | 90 | 90 | 60 | 120 |
| L0 | mm | 22 | 22 | 26 | 20 |
| L1 | mm | 6 | 6 | 10 | 4 |
| L2 | mm | 5 | 2 | 6 | 2 |
| L3 | mm | 5 | 8 | 4 | 2 |
| (L1 + L2)/L0 |  | 0.50 | 0.36 | 0.62 | 0.30 |
| (L1 + L2)/(2 × L3) |  | 1.10 | 0.50 | 2.00 | 1.50 |
| SB | mm² | 50 | 22.6 | 30.5 | 21.4 |
| SR | mm² | 35 | 35 | 45 | 30 |
| SB/SR |  | 1.43 | 0.65 | 0.68 | 0.71 |
| K | mm | 10 | 10 | 20 | 11 |
| L0/K |  | 2.2 | 2.2 | 1.3 | 1.8 |
| Rubber occupancy | % | 180 | 10 | 230 | 20 |
| Presence/absence of filler layer |  | No | No | No | No |
| SF | mm² | — | — | — | — |
| SB/SF |  | — | — | — | — |
| SB/(SR + SF) |  | — | — | — | — |
| Wire average diameter | mm | 1.2 | 1.2 | 1.2 | 1.2 |
| Wire total cross-sectional area | mm² | 22.6 | 22.6 | 30.5 | 21.4 |
| Tire mass | Index value | 100 | 105 | 90 | 105 |
| Rim disengagement resistance | Index value | 100 | 95 | 105 | 105 |
| Run-flat durability | Index value | 100 | 95 | 105 | 103 |

|  |  | Comparative Example 3 | Example 2 | Example 3 | Comparative Example 4 |
|---|---|---|---|---|---|
| Bead core structure |  | FIG. 2* | FIG. 2* | FIG. 2* | FIG. 2* |
| Presence/absence of bead filler |  | No | No | No | No |
| W0 | mm | 6 | 6 | 6 | 6 |
| W1 | mm | 4.8 | 4.8 | 4.8 | 4.8 |
| W2 | mm | 1.2 | 1.2 | 1.2 | 1.2 |
| α | ° | 120 | 120 | 120 | 120 |
| β | ° | 120 | 120 | 120 | 120 |
| L0 | mm | 20 | 20 | 20 | 20 |
| L1 | mm | 2 | 3 | 5 | 5 |
| L2 | mm | 2 | 2 | 3 | 4 |
| L3 | mm | 2 | 2 | 3 | 4 |
| (L1 + L2)/L0 |  | 0.20 | 0.25 | 0.40 | 0.45 |
| (L1 + L2)/(2 × L3) |  | 1.00 | 1.25 | 1.33 | 1.13 |
| SB | mm² | 20.7 | 21 | 22.1 | 22.8 |
| SR | mm² | 30 | 30 | 30 | 30 |
| SB/SR |  | 0.69 | 0.70 | 0.74 | 0.76 |
| K | mm | 11 | 11 | 11 | 11 |
| L0/K |  | 1.8 | 1.8 | 1.8 | 1.8 |
| Rubber occupancy | % | 20 | 20 | 20 | 20 |
| Presence/absence of filler layer |  | No | No | No | No |
| SF | mm² | — | — | — | — |
| SB/SF |  | — | — | — | — |
| SB/(SR + SF) |  | — | — | — | — |
| Wire average diameter | mm | 1.2 | 1.2 | 1.2 | 1.2 |
| Wire total cross-sectional area | mm² | 20.7 | 21 | 22.1 | 22.8 |
| Tire mass | Index value | 106 | 105 | 100 | 95 |
| Rim disengagement resistance | Index value | 95 | 100 | 105 | 106 |

TABLE 1-continued

| Run-flat durability | Index value | 103 | 103 | 103 | 103 |

Figure 3C:
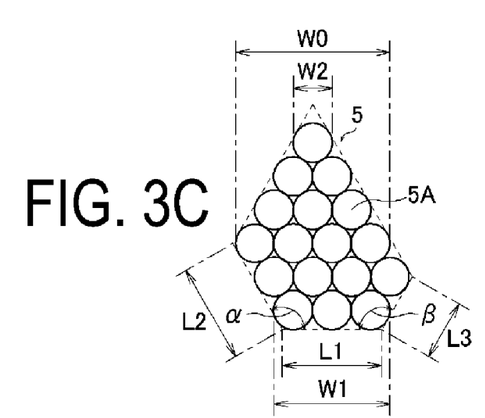
Figure 3D:
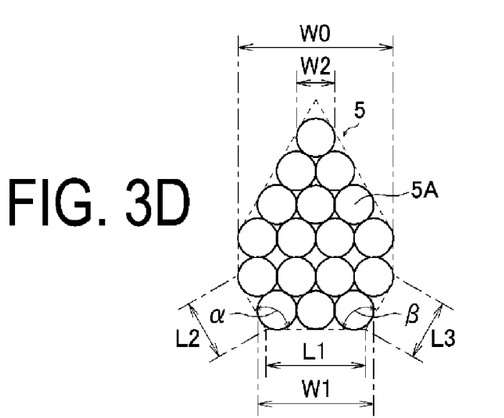

|  |  | Comparative Example 5 | Example 4 | Example 5 | Comparative Example 6 |
|---|---|---|---|---|---|
| Bead core structure |  | FIG. 3C* | FIG. 2* | FIG. 3C* | FIG. 3C* |
| Presence/absence of bead filler |  | No | No | No | No |
| W0 | mm | 6 | 6 | 6 | 6 |
| W1 | mm | 4.8 | 4.8 | 4.8 | 4.8 |
| W2 | mm | 1.2 | 1.2 | 1.2 | 1.2 |
| α | ° | 120 | 120 | 120 | 120 |
| β | ° | 120 | 120 | 120 | 120 |
| L0 | mm | 20 | 20 | 20 | 20 |
| L1 | mm | 3 | 3 | 6 | 7 |
| L2 | mm | 2 | 3 | 4 | 5 |
| L3 | mm | 5 | 3 | 2 | 2 |
| (L1 + L2)/L0 |  | 0.25 | 0.30 | 0.50 | 0.60 |
| (L1 + L2)/(2 × L3) |  | 0.50 | 1.00 | 2.50 | 3.00 |
| SB | mm² | 21.4 | 21.4 | 21.4 | 21.4 |
| SR | mm² | 30 | 30 | 30 | 30 |
| SB/SR |  | 0.71 | 0.71 | 0.71 | 0.71 |
| K | mm | 11 | 11 | 11 | 11 |
| L0/K |  | 1.8 | 1.8 | 1.8 | 1.8 |
| Rubber occupancy | % | 20 | 20 | 20 | 20 |
| Presence/absence of filler layer |  | No | No | No | No |
| SF | mm² | — | — | — | — |
| SB/SF |  | — | — | — | — |
| SB/(SR + SF) |  | — | — | — | — |
| Wire average diameter | mm | 1.2 | 1.2 | 1.2 | 1.2 |
| Wire total cross-sectional area | mm² | 21.4 | 21.4 | 21.4 | 21.4 |
| Tire mass | Index value | 106 | 105 | 100 | 95 |
| Rim disengagement resistance | Index value | 95 | 100 | 105 | 106 |
| Run-flat durability | Index value | 103 | 103 | 103 | 103 |

TABLE 2

|  |  | Example 6 | Example 7 | Example 8 | Example 9 | Example 10 |
|---|---|---|---|---|---|---|
| Bead core structure |  | FIG. 3A | FIG. 3B | FIG. 3C | FIG. 3D | FIG. 2 |
| Presence/absence of bead filler |  | No | No | No | No | No |
| W0 | mm | 4.8 | 4.8 | 4.8 | 4.8 | 6 |
| W1 | mm | 3.6 | 3.6 | 3.6 | 3.6 | 4.8 |
| W2 | mm | 1.2 | 2.4 | 1.2 | 1.2 | 1.2 |
| α | ° | 120 | 120 | 120 | 120 | 120 |
| β | ° | 120 | 120 | 120 | 120 | 120 |
| L0 | mm | 17 | 15 | 19 | 19 | 20 |
| L1 | mm | 3 | 3 | 3 | 3 | 4 |
| L2 | mm | 2 | 2 | 3 | 2 | 2 |
| L3 | mm | 2 | 2 | 2 | 2 | 2 |
| (L1 + L2)/L0 |  | 0.29 | 0.33 | 0.32 | 0.26 | 0.30 |
| (L1 + L2)/(2 × L3) |  | 1.25 | 1.25 | 1.50 | 1.25 | 1.50 |
| SB | mm² | 14.7 | 13.6 | 19.2 | 19.2 | 21.4 |
| SR | mm² | 30 | 30 | 30 | 30 | 53.5 |
| SB/SR |  | 0.49 | 0.45 | 0.64 | 0.64 | 0.40 |
| K | mm | 11 | 11 | 11 | 11 | 11 |
| L0/K |  | 1.5 | 1.4 | 1.7 | 1.7 | 1.8 |
| Rubber occupancy | % | 20 | 20 | 20 | 20 | 20 |
| Presence/absence of filler layer |  | No | No | No | No | No |
| SF | mm² | — | — | — | — | — |
| SB/SF |  | — | — | — | — | — |
| SB/(SR + SF) |  | — | — | — | — | — |
| Wire average diameter | mm | 1.2 | 1.2 | 1.2 | 1.2 | 1.2 |
| Wire total cross-sectional area | mm² | 14.7 | 13.6 | 19.2 | 19.2 | 21.4 |

TABLE 2-continued

| | | | | | | |
|---|---|---|---|---|---|---|
| Tire mass | Index value | 113 | 115 | 105 | 105 | 107 |
| Rim disengagement resistance | Index value | 103 | 100 | 107 | 105 | 107 |
| Run-flat durability | Index value | 103 | 103 | 103 | 103 | 105 |

| | | Example 11 | Example 12 | Example 13 | Example 14 | Example 15 |
|---|---|---|---|---|---|---|
| Bead core structure | | FIG. 2 | FIG. 2 | FIG. 2 | FIG. 2 | FIG. 2 |
| Presence/absence of bead filler | | No | No | No | No | No |
| W0 | mm | 6 | 6 | 6 | 6 | 6 |
| W1 | mm | 4.8 | 4.8 | 4.8 | 4.8 | 4.8 |
| W2 | mm | 1.2 | 1.2 | 1.2 | 1.2 | 1.2 |
| α | ° | 120 | 120 | 120 | 120 | 120 |
| β | ° | 120 | 120 | 120 | 120 | 120 |
| L0 | mm | 20 | 20 | 20 | 20 | 20 |
| L1 | mm | 4 | 4 | 4 | 4 | 4 |
| L2 | mm | 2 | 2 | 2 | 2 | 2 |
| L3 | mm | 2 | 2 | 2 | 2 | 2 |
| (L1 + L2)/L0 | | 0.30 | 0.30 | 0.30 | 0.30 | 0.30 |
| (L1 + L2)/(2 × L3) | | 1.50 | 1.50 | 1.50 | 1.50 | 1.50 |
| SB | mm$^2$ | 21.4 | 21.4 | 21.4 | 21.4 | 21.4 |
| SR | mm$^2$ | 30 | 8.56 | 30 | 30 | 30 |
| SB/SR | | 0.71 | 2.50 | 0.71 | 0.71 | 0.71 |
| K | mm | 11 | 11 | 4 | 11 | 16.7 |
| L0/K | | 1.8 | 1.8 | 5.0 | 1.8 | 1.2 |
| Rubber occupancy | % | 20 | 20 | 20 | 20 | 20 |
| Presence/absence of filler layer | | No | No | No | No | No |
| SF | mm$^2$ | — | — | — | — | — |
| SB/SF | | — | — | — | — | — |
| SB/(SR + SF) | | — | — | — | — | — |
| Wire average diameter | mm | 1.2 | 1.2 | 1.2 | 1.2 | 1.2 |
| Wire total cross-sectional area | mm$^2$ | 21.4 | 21.4 | 21.4 | 21.4 | 21.4 |
| Tire mass | Index value | 110 | 113 | 113 | 108 | 107 |
| Rim disengagement resistance | Index value | 110 | 113 | 113 | 108 | 107 |
| Run-flat durability | Index value | 103 | 100 | 100 | 110 | 105 |

TABLE 3

| | | Example 16 | Example 17 | Example 18 | Example 19 | Example 20 |
|---|---|---|---|---|---|---|
| Bead core structure | | FIG. 2 | FIG. 2 | FIG. 2 | FIG. 2 | FIG. 2 |
| Presence/absence of bead filler | | No | No | No | No | No |
| W0 | mm | 6 | 6 | 6 | 6 | 6 |
| W1 | mm | 4.8 | 4.8 | 4.8 | 4.8 | 4.8 |
| W2 | mm | 1.2 | 1.2 | 1.2 | 1.2 | 1.2 |
| α | ° | 120 | 120 | 120 | 120 | 120 |
| β | ° | 120 | 120 | 120 | 120 | 120 |
| L0 | mm | 20 | 20 | 20 | 20 | 20 |
| L1 | mm | 4 | 4 | 4 | 4 | 4 |
| L2 | mm | 2 | 2 | 2 | 2 | 2 |
| L3 | mm | 2 | 2 | 2 | 2 | 2 |
| (L1 + L2)/L0 | | 0.30 | 0.30 | 0.30 | 0.30 | 0.30 |
| (L1 + L2)/(2 × L3) | | 1.50 | 1.50 | 1.50 | 1.50 | 1.50 |
| SB | mm$^2$ | 21.4 | 21.4 | 21.4 | 21.4 | 21.4 |
| SR | mm$^2$ | 30 | 30 | 30 | 30 | 60 |
| SB/SR | | 0.71 | 0.71 | 0.71 | 0.71 | 0.36 |
| K | mm | 11 | 11 | 11 | 11 | 11 |
| L0/K | | 1.8 | 1.8 | 1.8 | 1.8 | 1.8 |
| Rubber occupancy | % | 15 | 10 | 10 | 10 | 10 |
| Presence/absence of filler layer | | No | No | Yes | Yes | Yes |
| SF | mm$^2$ | — | — | 4 | 8.9 | 18 |
| SB/SF | | — | — | 5.35 | 2.40 | 1.19 |
| SB/(SR + SF) | | — | — | 0.63 | 0.55 | 0.27 |

TABLE 3-continued

| | | | | | | |
|---|---|---|---|---|---|---|
| Wire average diameter | mm | 1.2 | 1.2 | 1.2 | 1.2 | 1.2 |
| Wire total cross-sectional area | mm² | 21.4 | 21.4 | 21.4 | 21.4 | 21.4 |
| Tire mass | Index value | 109 | 110 | 108 | 107 | 103 |
| Rim disengagement resistance | Index value | 108 | 108 | 110 | 110 | 108 |
| Run-flat durability | Index value | 110 | 110 | 113 | 114 | 118 |

| | | Example 21 | Example 22 | Example 23 | Example 24 |
|---|---|---|---|---|---|
| Bead core structure | | FIG. 2 | FIG. 2 | FIG. 2 | FIG. 2 |
| Presence/absence of bead filler | | No | No | No | No |
| W0 | mm | 6 | 6 | 6 | 6 |
| W1 | mm | 4.8 | 4.8 | 4.8 | 4.8 |
| W2 | mm | 1.2 | 1.2 | 1.2 | 1.2 |
| α | ° | 120 | 120 | 120 | 120 |
| β | ° | 120 | 120 | 120 | 120 |
| L0 | mm | 20 | 20 | 20 | 20 |
| L1 | mm | 4 | 4 | 4 | 4 |
| L2 | mm | 2 | 2 | 2 | 2 |
| L3 | mm | 2 | 2 | 2 | 2 |
| (L1 + L2)/L0 | | 0.30 | 0.30 | 0.30 | 0.30 |
| (L1 + L2)/(2 × L3) | | 1.50 | 1.50 | 1.50 | 1.50 |
| SB | mm² | 21.4 | 21.4 | 10 | 50 |
| SR | mm² | 30 | 30 | 23 | 23 |
| SB/SR | | 0.71 | 0.71 | 0.43 | 2.17 |
| K | mm | 11 | 11 | 11 | 11 |
| L0/K | | 1.8 | 1.8 | 1.8 | 1.8 |
| Rubber occupancy | % | 10 | 10 | 10 | 10 |
| Presence/absence of filler layer | | Yes | Yes | Yes | Yes |
| SF | mm² | 35.7 | 18 | 7 | 25 |
| SB/SF | | 0.60 | 1.19 | 1.43 | 2.00 |
| SB/(SR + SF) | | 0.33 | 0.45 | 0.33 | 1.04 |
| Wire average diameter | mm | 1.2 | 1.2 | 0.8 | 1.8 |
| Wire total cross-sectional area | mm² | 21.4 | 21.4 | 10 | 50 |
| Tire mass | Index value | 105 | 108 | 115 | 103 |
| Rim disengagement resistance | Index value | 108 | 110 | 103 | 115 |
| Run-flat durability | Index value | 117 | 116 | 115 | 115 |

As can be seen from Table 1, in each of Examples 1 to 24, the tire mass was reduced while the run-flat durability was maintained or improved compared to Conventional Example 1. On the other hand, in Comparative Example 1, the shape of the bead core was improper, and thus the rim disengagement resistance and the run-flat durability were deteriorated. In Comparative Example 2, the shape of the bead core was improper, and thus the tire mass was increased. In Comparative Example 3, the value of (L1+L2)/L0 was too small, and thus the rim disengagement resistance was deteriorated. In Comparative Example 4, the value of (L1+L2)/L0 was too large, and thus the tire mass was increased. In Comparative Example 5, the value of (L1+L2)/(2×L3) was too small, and thus the rim disengagement resistance was deteriorated. In Comparative Example 6, the value of (L1+L2)/(2×L3) was too large, and thus the tire mass was increased.

The invention claimed is:

1. A pneumatic tire, comprising:
a tread portion extending in a tire circumferential direction and having an annular shape;
a pair of sidewall portions disposed on opposite sides of the tread portion;
a pair of bead portions disposed toward the inside of the sidewall portions in a tire radial direction;
a bead core provided in each of the bead portions;
a carcass layer mounted between the pair of bead portions; and
a side reinforcing layer provided toward the inside of the carcass layer in the sidewall portion in a tire lateral direction and having a crescent-shape in cross-section; wherein
the bead core comprises at least one bead wire wound in the tire circumferential direction,
a plurality of circumferential portions of the bead wire form at least one row arranged in the tire lateral direction and a plurality of layers overlapping in the tire radial direction,
a maximum width W0 of the bead core, a width W1 of one of the layers, which is located at an innermost side in the tire radial direction, and a width W2 of another of the layers, which is located at an outermost side in the tire radial direction, satisfy relationships W1>W2 and W2≤0.5×W0,
the layer of the plurality of layers, having the maximum width W0, is located toward the inside in the tire radial direction of a center position of the bead core in the tire radial direction,
when a polygonal shape formed by common tangent lines of the plurality of circumferential portions of the bead wire in a meridian cross-section is defined as an outer shape of the bead wire, internal angles α, β of corner portions located on opposite ends of one side of the outer shape, which is located toward the inside in the tire radial direction, satisfy relationships α>90° and β>90°, a peripheral length L0 of the outer shape, a length L1 of the side of the outer shape, which is located toward the inside in the tire radial direction, a length L2 of another side of the outer shape, which is connected to the side located toward the inside in the tire radial direction and which is inclined at a bead toe, and a length L3 of another side of the outer shape, which is connected to the side located toward the inside in the tire radial direction and which is inclined at a bead heel, satisfy relationships 0.25≤(L1+L2)/L0≤0.40 and 1.0≤(L1+L2)/(2×L3)≤2.5, the carcass layer comprises a body portion extending from the tread portion through each of the sidewall portions to each of the bead portions, and a folded back portion folded at each of the bead portions and curved along a periphery of the bead core, and extending toward each of the sidewall portions while contacting the body portion from an outer end position of the bead core in the tire radial direction, and when an auxiliary line A0 being perpendicular to the carcass layer through an intersection point between an outline of an outer surface of the sidewall portion and a straight line separated from the bead toe by 20 mm toward the outside in the tire radial direction and extending in parallel with the tire radial direction, an auxiliary line A1 separated from the auxiliary line A0 by 5 mm toward the inside in the tire radial direction and being parallel with the auxiliary line A0, and an auxiliary line A2 separated from the auxiliary line A0 by 5 mm toward the outside in the tire radial direction and being parallel with the auxiliary line A0 are drawn in the meridian cross-section, a cross-sectional area SR of a portion of the side reinforcing layer, which is present between the auxiliary line A1 and the auxiliary line A2, and an area SB of a closed region formed by the body portion and the folded back portion of the carcass layer satisfy a relationship 0.4≤SB/SR≤2.5.

2. The pneumatic tire according to claim 1, wherein in the meridian cross-section, the peripheral length L0 of the outer shape of the bead core and a tire cross-sectional width K on an auxiliary line A0 being perpendicular to the carcass layer through an intersection point between an outline of an outer surface of the sidewall portion and a straight line separated from the bead toe by 20 mm toward the outside in the tire radial direction and extending in parallel with the tire radial direction satisfy the relationship 1.2≤L0/K≤5.0.

3. The pneumatic tire according to claim 1, wherein a ratio of a total area of rubber present in a closed region formed by the body portion and the folded back portion of the carcass layer to an area of the closed region is from 0.1% to 15%.

4. The pneumatic tire according to claim 3, wherein a filler layer is provided toward the outside of the body portion and the folded back portion of the carcass layer in the tire lateral direction.

5. The pneumatic tire according to claim 4, wherein when an auxiliary line A0 being perpendicular to the carcass layer through an intersection point between an outline of an outer surface of the sidewall portion and a straight line separated from the bead toe by 20 mm toward the outside in the tire radial direction and extending in parallel with the tire radial direction, an auxiliary line A1 separated from the auxiliary line A0 by 5 mm toward the inside in the tire radial direction and being parallel with the auxiliary line A0, and an auxiliary line A2 separated from the auxiliary line A0 by 5 mm toward the outside in the tire radial direction and being parallel with the auxiliary line A0 are drawn in the meridian cross-section, a cross-sectional area SF of a portion of the filler layer, which is present between the auxiliary line A1 and the auxiliary line A2, and an area SB of a closed region formed by the body portion and the folded back portion of the carcass layer satisfy a relationship 0.6≤SB/SF≤2.4.

6. The pneumatic tire according to claim 4, wherein when an auxiliary line A0 being perpendicular to the carcass layer through an intersection point between an outline of an outer surface of the sidewall portion and a straight line separated from the bead toe by 20 mm toward the outside in the tire radial direction and extending in parallel with the tire radial direction, an auxiliary line A1 separated from the auxiliary line A0 by 5 mm toward the inside in the tire radial direction and being parallel with the auxiliary line A0, and an auxiliary line A2 separated from the auxiliary line A0 by 5 mm toward the outside in the tire radial direction and being parallel with the auxiliary line A0 are drawn in the meridian cross-section, a cross-sectional area SR of a portion of the side reinforcing layer, which is present between the auxiliary line A1 and the auxiliary line A2, a cross-sectional area SF of a portion of the filler layer, which is present between the auxiliary line A1 and the auxiliary line A2, and an area SB of a closed region formed by the body portion and the folded back portion of the carcass layer satisfy a relationship 0.3≤SB/(SR+SF)≤2.0.

7. The pneumatic tire according to claim 1, wherein an average diameter of the bead wire is from 0.8 mm to 1.8 mm.

8. The pneumatic tire according to claim 1, wherein a total cross-sectional area of the bead wire is from 10 $mm^2$ to 50 $mm^2$.

9. The pneumatic tire according to claim 1, wherein the length L2 of the side of the outer shape of the bead core, which is connected to the side located toward the inside in the tire radial direction and which is inclined at the bead toe, is from 1.5 mm to 8 mm.

10. The pneumatic tire according to claim 1, wherein the length L1 of the side of the outer shape of the bead core, which is located toward the inside in the tire radial direction, is from 2 mm to 10 mm.

11. The pneumatic tire according to claim 2, wherein a ratio of a total area of rubber present in the closed region to an area of the closed region formed by the body portion and the folded back portion of the carcass layer is from 0.1% to 15%.

12. The pneumatic tire according to claim 11, wherein a filler layer is provided toward the outside of the body portion and the folded back portion of the carcass layer in the tire lateral direction.

13. The pneumatic tire according to claim 12, wherein when an auxiliary line A0 being perpendicular to the carcass layer through an intersection point between an outline of an outer surface of the sidewall portion and a straight line separated from the bead toe by 20 mm toward the outside in the tire radial direction and extending in parallel with the tire radial direction, an auxiliary line A1 separated from the auxiliary line A0 by 5 mm toward the inside in the tire radial direction and being parallel with the auxiliary line A0, and an auxiliary line A2 separated from the auxiliary line A0 by 5 mm toward the outside in the tire radial direction and being parallel with the auxiliary line A0 are drawn in the meridian cross-section, a cross-sectional area SF of a portion of the filler layer, which is present between the auxiliary line A1 and the auxiliary line A2, and an area SB of a closed region formed by the body portion and the folded back portion of the carcass layer satisfy a relationship $0.6 \leq SB/SF \leq 2.4$.

14. The pneumatic tire according to claim 13, wherein when an auxiliary line A0 being perpendicular to the carcass layer through an intersection point between an outline of an outer surface of the sidewall portion and a straight line separated from the bead toe by 20 mm toward the outside in the tire radial direction and extending in parallel with the tire radial direction, an auxiliary line A1 separated from the auxiliary line A0 by 5 mm toward the inside in the tire radial direction and being parallel with the auxiliary line A0, and an auxiliary line A2 separated from the auxiliary line A0 by 5 mm toward the outside in the tire radial direction and being parallel with the auxiliary line A0 are drawn in the meridian cross-section, a cross-sectional area SR of a portion of the side reinforcing layer, which is present between the auxiliary line A1 and the auxiliary line A2, a cross-sectional area SF of a portion of the filler layer, which is present between the auxiliary line A1 and the auxiliary line A2, and an area SB of a closed region formed by the body portion and the folded back portion of the carcass layer satisfy a relationship $0.3 \leq SB/(SR+SF) \leq 2.0$.

15. The pneumatic tire according to claim 14, wherein an average diameter of the bead wire is from 0.8 mm to 1.8 mm.

16. The pneumatic tire according to claim 15, wherein a total cross-sectional area of the bead wire is from 10 mm$^2$ to 50 mm$^2$.

17. The pneumatic tire according to claim 16, wherein the length L2 of the side of the outer shape of the bead core, which is connected to the side located toward the inside in the tire radial direction and which is inclined at the bead toe, is from 1.5 mm to 8 mm.

18. The pneumatic tire according to claim 17, wherein the length L1 of the side of the outer shape of the bead core, which is located toward the inside in the tire radial direction, is from 2 mm to 10 mm.

* * * * *